US008235240B2

(12) United States Patent
Hausberger

(10) Patent No.: US 8,235,240 B2
(45) Date of Patent: Aug. 7, 2012

(54) INNER CONTAINER SURROUNDED BY AN OUTER CONTAINER, USED FOR RECEIVING A CRYOGENIC LIQUID

(75) Inventor: Klaus Hausberger, Graz (AT)

(73) Assignee: Magna Steyr Fahrzeugtechnik AG & Co. KG, Graz (AT)

( * ) Notice: Subject to any disclaimer, the term of this patent is extended or adjusted under 35 U.S.C. 154(b) by 932 days.

(21) Appl. No.: 12/297,939

(22) PCT Filed: Apr. 23, 2007

(86) PCT No.: PCT/EP2007/003545
§ 371 (c)(1),
(2), (4) Date: Oct. 21, 2008

(87) PCT Pub. No.: WO2007/121969
PCT Pub. Date: Nov. 1, 2007

(65) Prior Publication Data

US 2009/0145909 A1 Jun. 11, 2009

(30) Foreign Application Priority Data

Apr. 21, 2006 (DE) ........................ 10 2006 018 639

(51) Int. Cl.
*B60K 15/03* (2006.01)

(52) U.S. Cl. .................................................... 220/560.1

(58) Field of Classification Search ............... 220/560.1, 220/560.09, 560.11, 507, 4.12, 4.13, 4.14, 220/612
See application file for complete search history.

(56) References Cited

U.S. PATENT DOCUMENTS 5,547,096 A * 8/1996 Kleyn .......................... 220/4.14
5,704,512 A * 1/1998 Falk et al. ..................... 220/501
6,412,650 B1 * 7/2002 Warner ........................ 220/4.12
6,691,889 B1 * 2/2004 Falk ............................. 220/563
7,344,045 B2 3/2008 Harper et al.
7,427,000 B2 9/2008 Austerhoff et al.
(Continued)

FOREIGN PATENT DOCUMENTS

EP 0895017 2/1999
EP 1067300 1/2001
(Continued)

*Primary Examiner* — Steven A. Reynolds
*Assistant Examiner* — King M Chu
(74) *Attorney, Agent, or Firm* — Bachman & LaPointe, P.C.

(57) ABSTRACT

A flat inner container (3), especially an internal tank for a road vehicle, which is surrounded by an outer container (1) and is used for receiving a cryogenic liquid, particularly a fuel. The inner container (3) comprises a combination of the following features: a longitudinally extending monolithic base (4) with a top wall (5) and a bottom wall (6) which are connected to also longitudinally extending sidewalls (7), and with at least two longitudinally extending, substantially straight webs (9) that connect the bottom wall (6) to the top wall (5) so as to form at least one longitudinally extending chamber (10) which is arranged between the webs, extends along the entire length of the base (4) as well as from the bottom wall (6) to the top wall (5), and has a predetermined width between the webs; and at least two caps (11) which tightly seal the two open ends of the base (4) at the periphery; the top wall and/or the bottom wall is/are provided with an arch relative to a planar reference top wall and/or reference bottom wall, the distance of the arch between the inner contour of the top wall and/or the bottom wall and the planar reference top wall and/or reference bottom wall amounting to less than 30 percent of the width of the chamber in the center between the webs.

10 Claims, 6 Drawing Sheets

U.S. PATENT DOCUMENTS

| | | | | |
|---|---|---|---|---|
| 7,775,391 | B2 | 8/2010 | Harper | |
| 2002/0088806 | A1 | 7/2002 | Takaku et al. | |
| 2005/0269333 | A1 * | 12/2005 | Burrington et al. | 220/562 |

FOREIGN PATENT DOCUMENTS

| | | |
|---|---|---|
| EP | 1286103 | 2/2003 |
| EP | 1426673 | 6/2004 |
| EP | 1493961 | 1/2005 |
| GB | 2089014 | 6/1982 |
| WO | 0100434 | 1/2001 |
| WO | 2005028946 | 3/2005 |
| WO | 2006001711 | 1/2006 |

* cited by examiner

INNER CONTAINER SURROUNDED BY AN OUTER CONTAINER, USED FOR RECEIVING A CRYOGENIC LIQUID

BACKGROUND OF THE INVENTION

The invention relates to an inner tank, of flat design, which is surrounded by an outer tank and serves to hold a cryogenic liquid, in particular a fuel, in particular an inner tank for a road-going vehicle.

Usually, for use in motor vehicles, cryogenic fuels are inserted into cylindrical, that is to say barrel-shaped tanks which are designed as double-walled steel tanks. However, only poor space utilization is possible in this way; steel tanks of said type take up the entire luggage space of a motor vehicle. DE 101 63 029 A1 presents a barrel-shaped high-pressure hydrogen tank of said type in which an inner polyethylene lining is surrounded by an outer winding which is intended to prevent a bulging effect.

A flat, cuboidal design of tanks for cryogenic fuels is desirable in particular for use in motor vehicles. This creates the problem of obtaining sufficient strength and stability, in particular sufficient stiffness or rigidity against buckling, of the tank.

Conventional reinforcement measures for tanks with large planar surfaces are usually very massive. Thick sheet-metal wall thicknesses entail both complex production techniques and also joining techniques as a result of a large number of web plates or bulkhead plates used in the cryogenic inner tank; a high weight is the ultimate result.

A tank, of flat design, of the type described in the introduction is known for example from EP 1 067 300 A1. The tank has an upper shell and a lower shell composed of plastic, wherein the shells are connected to one another by means of a plurality of tubular tensile struts in order to prevent buckling of the tank as a result of the internal pressure. Although expedient space utilization is possible in this way, especially since the tank may be adapted to the available stowage space, it is however disadvantageous that a separate tank must be developed for each motor vehicle model, which in any case also always entails new dies and tools.

The invention is concerned with avoiding the disadvantages and difficulties associated with the prior art, and addresses the problem of creating a tank of the type described in the introduction, in particular a cryogenic tank for storing cooled liquid hydrogen, which can be produced in a simple and economical manner, which can be easily adapted during production to a predefined cuboidal installation space of a motor vehicle, which also has an expedient ratio of weight of the maximum liquid capacity to inherent weight, and which makes it possible to make do without subsequent machining, for example by providing bores for the purpose of filling and extraction.

The object is achieved by means of an inner tank wherein, to determine the bulging of the top wall and/or base wall, a planar reference top wall and/or reference base wall is defined, with said reference top wall and/or reference base wall being defined in each case as the planar connecting plane of the base-side or top-side straight ends of the webs.

According to one embodiment of the invention, the top wall and/or base wall has a curvature which is substantially dependent on the expected inner pressure in the inner tank. It is ensured according to the invention that, as a result of the predefined slight curvature, the occurring notch stresses between the curved surfaces of the base wall and/or of the top wall and also the effective dead spaces between the inner and outer tank are kept small.

Curvatures greater than the curvatures according to the invention pose a considerable risk to installation space efficiency, in particular since, according to the prior art, multilayer isolation (MLI) should be provided around the inner tank.

According to one particular embodiment, one of the webs coincides with a substantially straight side wall. Here, specifically, a design of an inner tank having two chambers is provided, with a single web being provided between the two chambers, but at least one of the two side walls being of substantially straight design. In particular for the determination of the bulging of the base wall and/or top wall according to the claim, the side wall is considered here as a second web. The top wall and/or base wall preferably at least partially has a convex curvature as viewed from the outside.

According to one embodiment of the invention, the tank has the following features:

- a longitudinally extending, single-piece basic body having a top wall and a base wall which are connected by means of likewise longitudinally extending side walls, and having at least one longitudinally running, substantially straight web which connects the base wall to the top wall so as to form at least two longitudinally extending chambers which are arranged adjacent to one another and which extend over the entire length of the basic body and in each case from the base wall to the top wall, and
- caps which sealingly close off two open ends of the basic body in each case at the periphery and which engage over the ends of the chambers in each case, which caps form a free space which connects the chambers.

According to one particular embodiment, at least one of the caps directly adjoins the basic body in an abutting fashion.

According to one embodiment of the invention, the top wall and/or base wall has, in each case with respect to a planar reference top wall and/or reference base wall, a bulge with a spacing, measured centrally between the webs, in each case between the inner contour of the top wall and/or base wall and the planar reference top wall and/or reference base wall, of less than 25%, preferably less than 20%, particularly preferably less than 15%, of the width of the chamber.

According to one embodiment of the invention, the base wall and/or the top wall are/is of substantially planar design.

According to one embodiment of the invention, the base wall and/or the top wall has, in each case with respect to a planar reference top wall and/or reference base wall, a bulge with a spacing, measured centrally between the webs, in each case between the inner contour of the top wall and/or base wall and the planar reference top wall and/or reference base wall, of more than 3%, in particular a spacing in the range between 5% and 15%, preferably between 5% and 10%, of the width of the chamber.

According to one embodiment of the invention, the caps engage over the ends of the chambers in each case. Here, according to various embodiments, provision is made of either individual caps which, at one end of the basic body, close off the chambers of the basic body separately, or of one cap which engages over a plurality of chambers and closes said chambers off together.

According to one embodiment of the invention, at least one of the caps forms a free space which connects the chambers. Said free space permits communication between the chambers of the basic body and it is possible in this way for an exchange or equalization of gas or liquid to take place between the chambers.

Alternatively, said exchange of gas or liquid could take place via corresponding openings in the webs in the region of the basic body.

According to one embodiment of the invention, at least one of the caps is of substantially flat or planar design. The production of such a cap is particularly simple and cost-effective. According to a further embodiment of the invention, a plurality of the caps are of substantially planar design, and at least one of the caps has a non-flat voluminous shape, with said cap being provided for the filling and/or extraction line and/or for holding the sensor arrangement, for example for determining the liquid level in the inner tank.

According to one embodiment of the invention, at least one of the webs has a cutout in the region of the fastening of at least one of the caps to the base wall and/or top wall. According to a preferred embodiment, all of the webs have at least one cutout, in particular in each case at each end. Here, a cutout is to be understood to mean in particular a recessing of an edge. As a result of the cutout in the region of the fastening, which is preferably produced according to the prior art by means of thermal processes such as welding or soldering processes, an excessive dissipation of heat via the web during the production of the fastening seam, in particular weld seam or solder seam, is prevented. In this way, it is possible to ensure a uniform fastening seam between the cap and the basic body. According to a further aspect, the cutouts can contribute to better communication of the chambers of the basic body, with it being possible for a corresponding exchange of gas or liquid between the chambers of the inner tank to take place through the cutouts.

According to one embodiment of the invention, at least one of the caps is fastened by means of a preferably encircling fastening seam, in particular a weld seam, to the basic body, and the webs have a cutout in each case in the region of the preferably encircling fastening seam, in particular weld seam.

According to one embodiment of the invention, at least one of the caps has a number of recesses into which the free end, which is aligned in the longitudinal direction of the basic body, of at least one of the webs projects. According to this embodiment, the stability of the inner tank and/or of the cap(s) which close(s) off the basic body can be increased significantly.

According to one embodiment, the web is fastened by means of a fastening seam, in particular a weld seam, to the cap in the region of the recess of the cap.

One embodiment, which is preferable with regard to strength and which is expedient in terms of production, is characterized in that the web is aligned approximately perpendicular to the base wall and to the top wall, which runs parallel to said base wall, of the basic body.

The inner tank preferably has a profile, transversely with respect to the longitudinal extent, in the shape of a rectangle, wherein for simple production of the caps, the longitudinal edges, which connect the side walls to the base wall and to the top wall, are of rounded design.

The basic body can be produced in a particularly expedient manner if it is designed as a single-piece extruded profile, with the wall thicknesses of all the walls preferably being approximately equal or the wall thickness of a web being smaller than that of the base wall, top wall and side walls.

The basic body can be produced in a particularly expedient manner if the wall thicknesses of all the walls are approximately equal or the wall thickness of a web is smaller than that of the base wall, top wall and side walls.

To avoid stress peaks, the inner tank is characterized in that the transitions between the web and base wall or top wall are of rounded design with a radius which is greater than or equal to the wall thickness of the web or the wall thickness of the base wall or top wall. According to a further embodiment, the transitions have a plurality of radii or at least portions of a free-form curve.

As a result of the high strength which can be obtained in structural terms, it is possible for the basic body and the caps to be formed from light metal, in particular from an aluminum alloy.

The caps are preferably deep-drawn, forged or cast, in particular by means of a pressure-die-casting process, with the caps expediently being connected to the basic body by means of an encircling weld seam.

The caps are preferably connected to the basic body by means of an encircling weld seam.

To connect the caps to the basic body, those edges which bear against one another expediently undergo pre-treatment, preferably at least one of the edges is provided with a rabbet so as to form an overlap of the components. A rabbet of said type is advantageous for the application of fusion welding processes.

Friction stir welding has proven to be particularly expedient for the production of the weld seam. It is also possible for so-called multi-orbital friction welding ("rotary friction welding" or "linear friction welding") or so-called "friction stir welding" to be used for producing a weld seam.

According to one preferred embodiment, any tank fittings, such as sensors for pressure and/or temperature and/or filling level and the associated lines, are provided in the interior of a cap, and are if appropriate integrated in a pipe stub of a cap.

A filling opening and/or an extraction opening are/is preferably provided in one of the caps.

To secure the position of the inner tank in the outer tank, mounting elements are preferably arranged on the caps, which mounting elements mount the inner tank on the outer tank.

A mounting element is preferably designed as a mounting sleeve, preferably from an aluminum alloy and expediently in a local indentation of the cap, into which mounting sleeve a synthetic part, preferably a fiber composite part, can be inserted, which synthetic part projects into a mounting sleeve which is provided on the outer tank.

Furthermore, to secure the position of the inner tank with respect to the outer tank, it is additionally possible for spacers to be fastened to the caps or integrally formed with the caps.

The position of the inner tank is preferably further secured if a filling and extracting line is guided on the top wall on the outside of the inner tank.

According to the invention, an inner tank (3), of flat design, which is surrounded by an outer tank and serves to hold a cryogenic liquid, in particular a fuel, in particular an inner tank for a road-going vehicle, is provided, which inner tank is characterized by the combination of the following features:

a longitudinally extending, single-piece basic body having a top wall and a base wall which are connected by means of likewise longitudinally extending side walls, and having at least one longitudinally running, substantially straight web which connects the base wall to the top wall so as to form two longitudinally extending chambers which are arranged at both sides of the web and which extend over the entire length of the basic body and in each case from the base wall to the top wall, with the longitudinally extending chamber having a predetermined width between the webs, and at least two caps which sealingly close off the two open ends of the basic body in each case at the periphery, and with the web having a cutout in the region of the fastening of at least one of the caps to the base wall and/or top wall.

According to one embodiment, at least one of the caps is fastened by means of a preferably encircling fastening seam, in particular a weld seam, to the basic body, and the webs have a cutout in each case in the region of the preferably encircling fastening seam, in particular weld seam.

According to one embodiment, at least one of the caps has a number of recesses into which the free end, which is aligned in the longitudinal direction of the basic body, of at least one of the webs projects.

According to one embodiment, the web is fastened by means of a fastening seam, in particular a weld seam, to the cap in the region of the recess of the cap.

According to the invention, an inner tank, of flat design, which is surrounded by an outer tank and serves to hold a cryogenic liquid, in particular a fuel, in particular an inner tank for a road-going vehicle, is provided, which inner tank is characterized by the combination of the following features:

a longitudinally extending basic body having a top wall and a base wall which are connected by means of likewise longitudinally extending side walls, and having at least one longitudinally running, substantially straight web which connects the base wall to the top wall so as to form two longitudinally extending chambers which are arranged at both sides of the web and which extend over the entire length of the basic body and in each case from the base wall to the top wall, and at least two caps which sealingly close off the two open ends of the basic body in each case at the periphery, and with at least one of the caps being of substantially flat design.

According to one embodiment, the web has a cutout in the region of the fastening of at least one of the caps to the base wall and/or top wall.

According to one embodiment, at least one of the caps is fastened by means of a preferably encircling fastening seam, in particular a weld seam, to the basic body, and the web has a cutout in each case in the region of the preferably encircling fastening seam, in particular weld seam.

According to one embodiment, at least one of the caps has a number of recesses into which the free end, which is aligned in the longitudinal direction of the basic body, of the web projects.

According to one embodiment, the web is fastened by means of a fastening seam, in particular a weld seam, to the cap in the region of the recess of the cap.

DETAILED DESCRIPTION

The invention is explained in more detail below on the basis of a plurality of non-restrictive exemplary embodiments which are illustrated in schematic drawings, wherein:

FIG. 1 showing a side view;

FIG. 2 an end view of an outer tank in which, to hold a cryogenic fuel, an inner tank is arranged;

Figure 8:
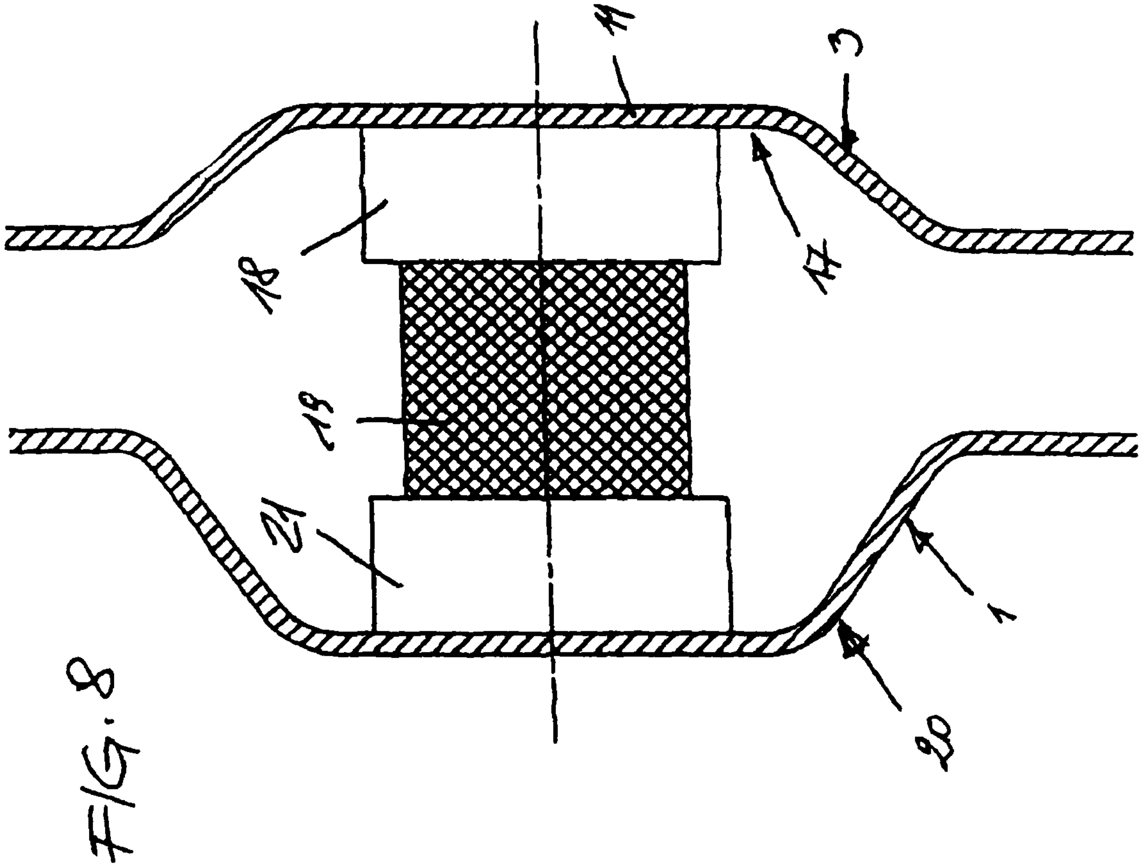
Figure 9:
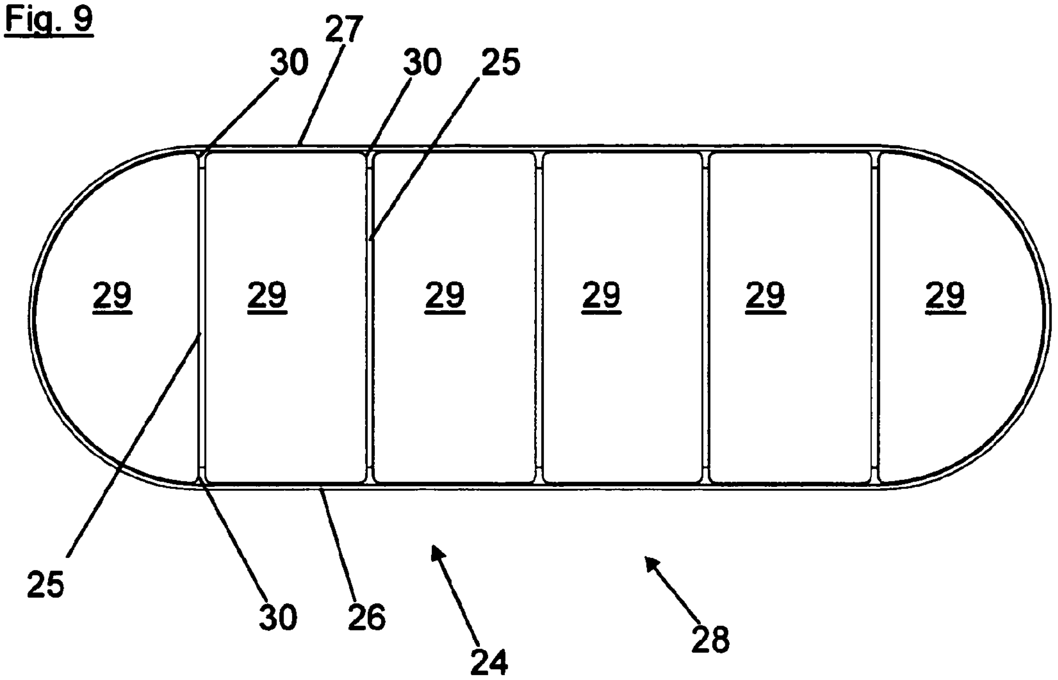
Figure 10:
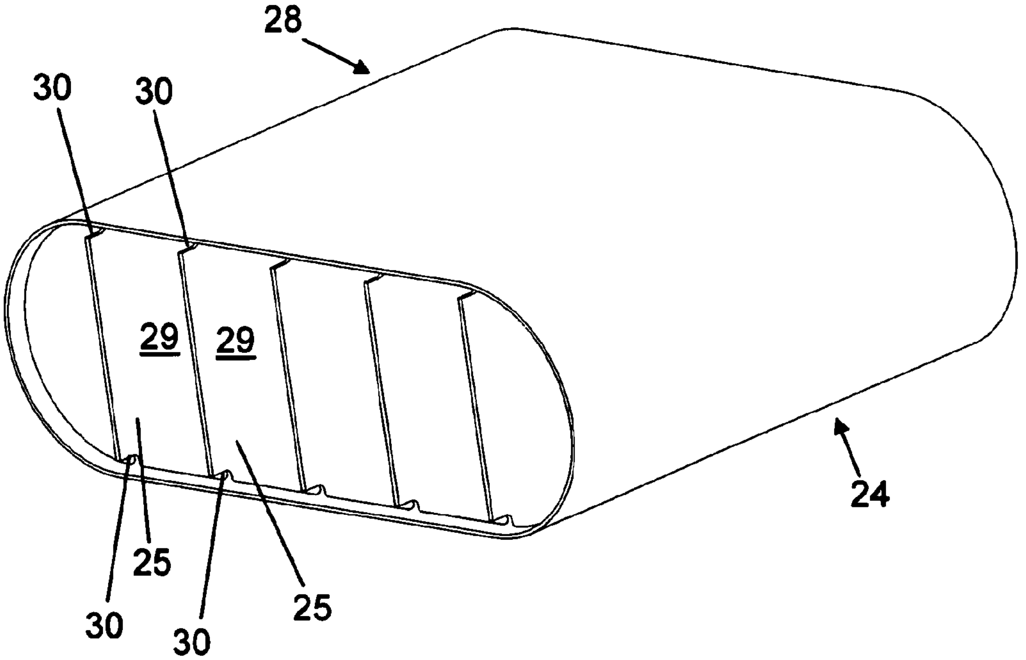
Figure 11:
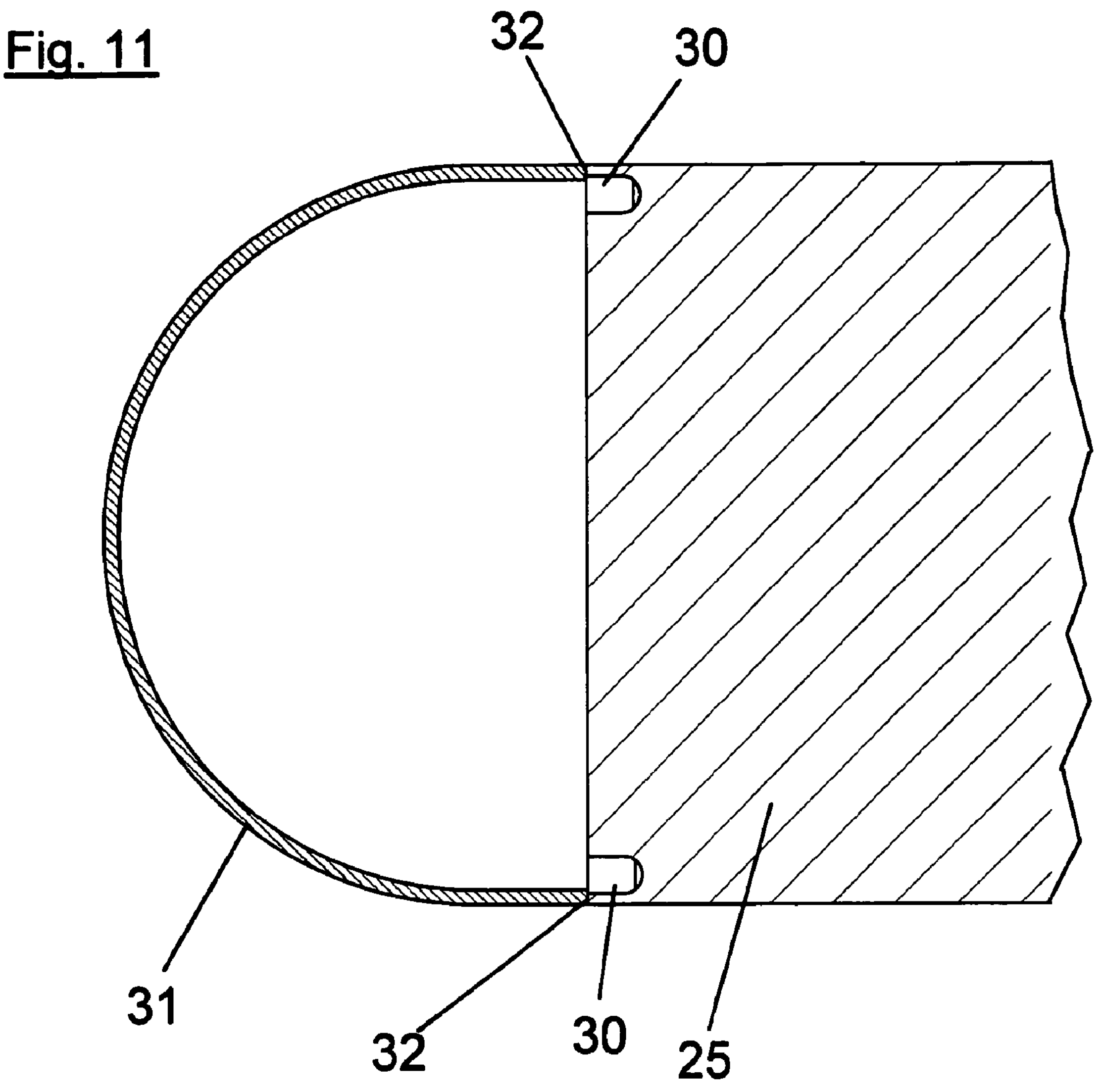
Figure 12:
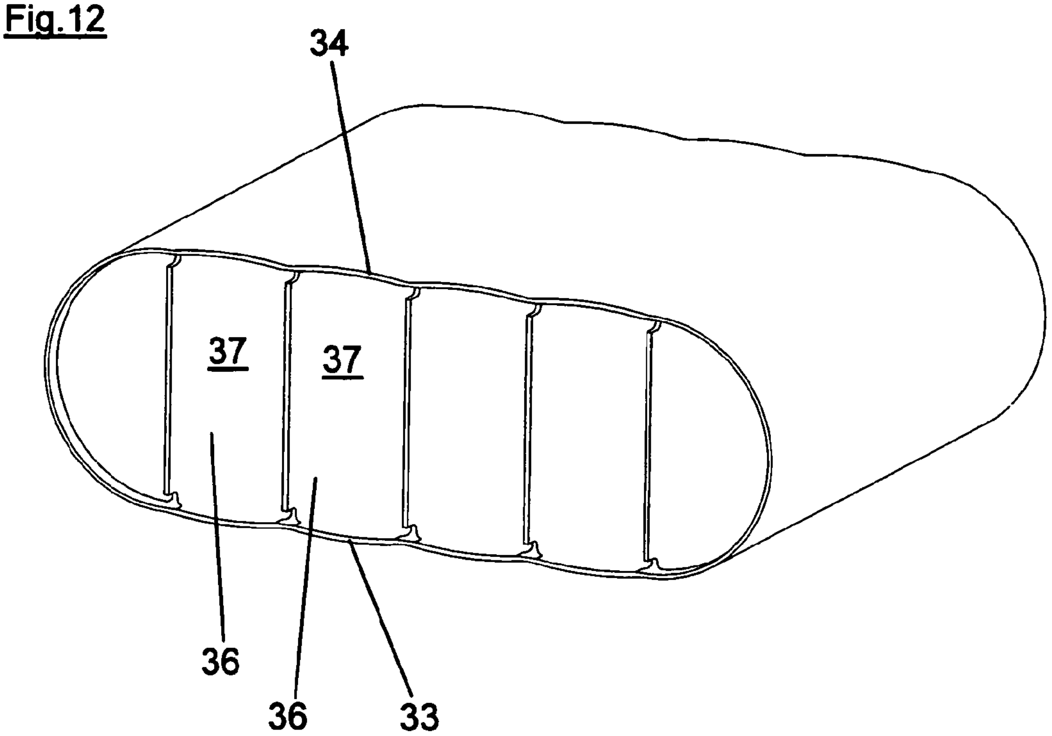
Figure 13:
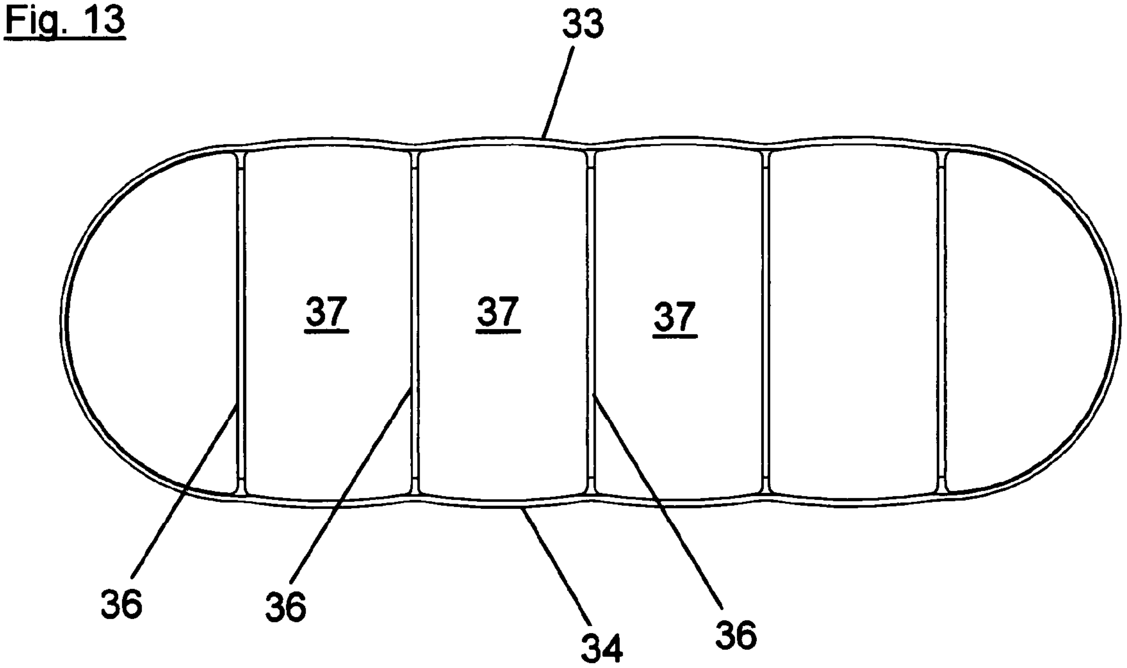
Figure 14:
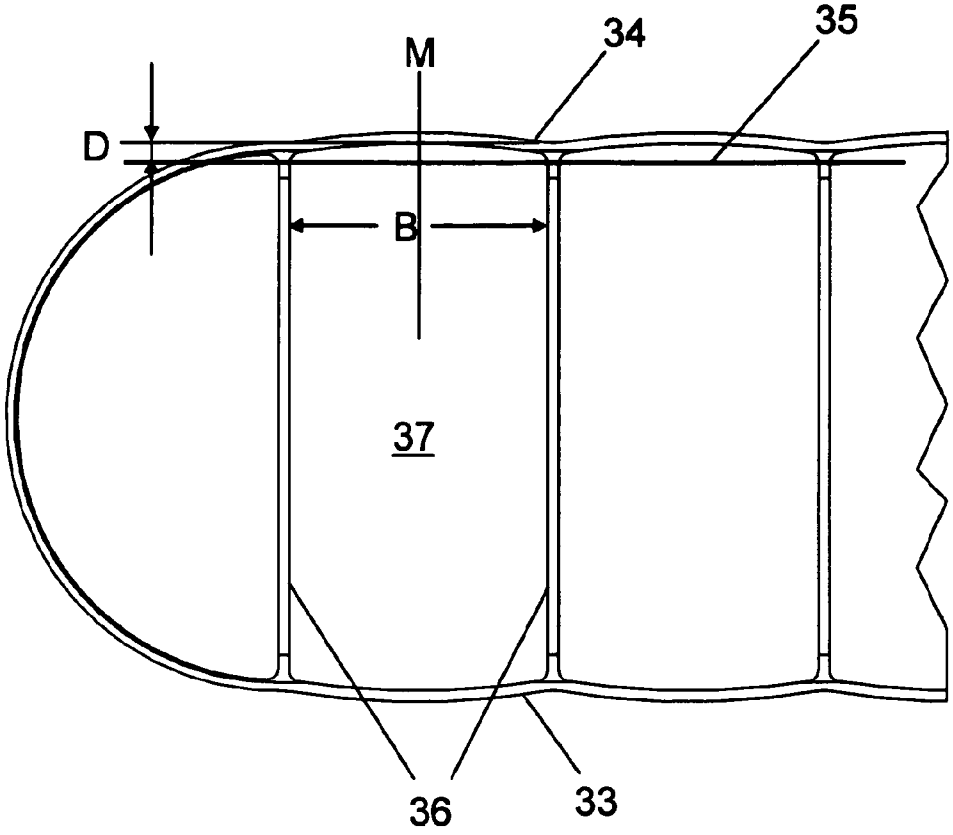

FIG. 8 details an arrangement for suspending the inner tank on the outer tank;

FIG. 9 shows a side view in the longitudinal direction of the inner tank which is open at the side;

FIG. 10 shows an axonometric view of the basic body;

FIG. 11 shows a section through and along one of the webs and the cap of the inner tank;

FIG. 12 shows an axonometric view of a further embodiment;

FIG. 13 illustrates a side view in the longitudinal direction of the inner tank which is open at the side;

FIG. 14 shows an enlarged view from FIG. 13; and

Figure 15:
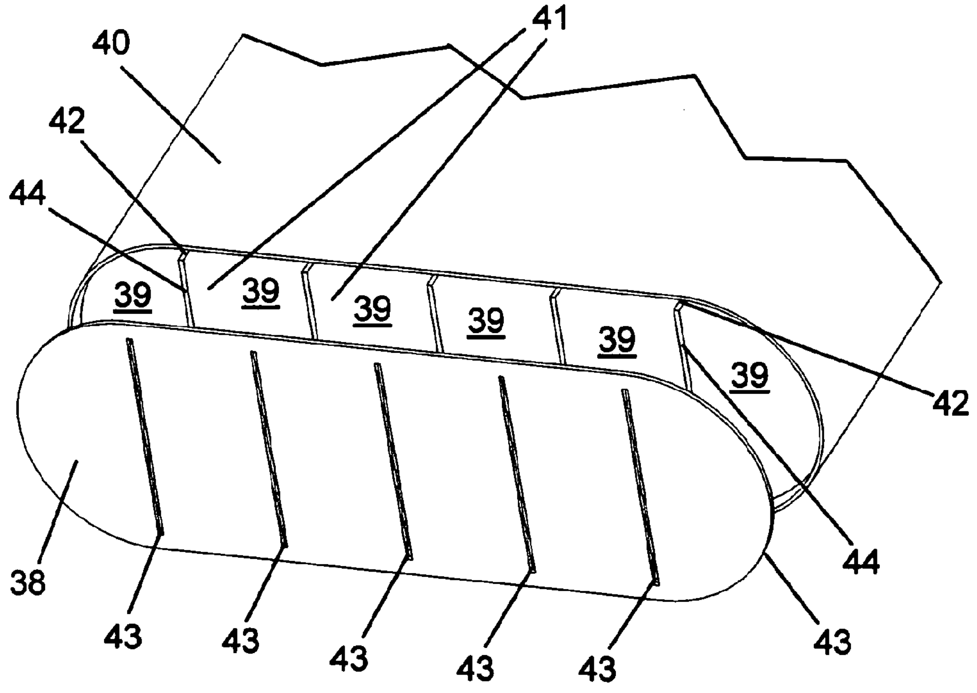

FIG. 15 illustrates a further embodiment of the invention which shows a part of the inner tank in an axonometric view, with the cap and the basic body being illustrated in a pulled-apart state for clarity.

DETAILED DESCRIPTION

A flat outer tank 1 which, with the exception of its rounded portions 2, has the shape of a flat cuboid, has inserted into it an inner tank 3 which is likewise designed as a flat cuboid which serves to hold a cryogenic liquid, in particular a cryogenic fuel. In order to be able to arrange sufficient insulation between the inner tank 3 and the outer tank 1, a cavity which surrounds the inner tank 3 in its entirety is provided between the inner tank 3 and the outer tank 4.

Figures 1, 2, 3, 4, 5, 6, 7:
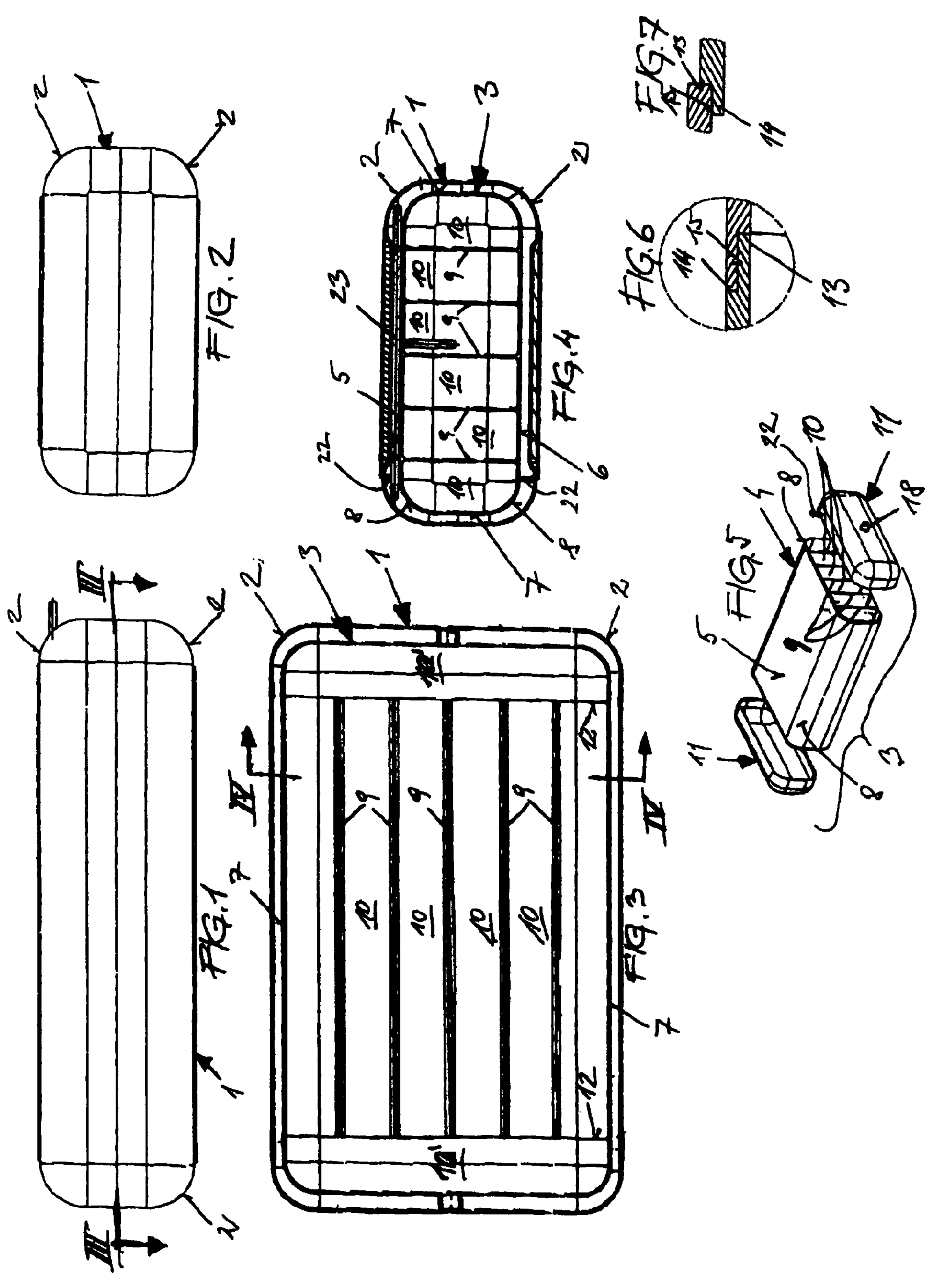
FIG. 3 shows a section through the outer tank as per the line III-III in FIG. 1.
FIG. 4 shows a section as per the line IV-IV of FIG. 3.
FIG. 5 shows an exploded illustration of the inner tank before its assembly.
FIG. 6 and FIG. 7 show different designs of a weld seam for the inner tank.

The inner tank 3 is formed from three parts which are illustrated in detail in FIG. 5, specifically by a basic body 4, which is of single-piece design, and a planar, smooth-surfaced top wall 5 and base wall 6 which are connected by means of rounded portions 8 to side walls 7 which extend along the basic body 4. Provided between the side walls 7 are webs 9 which extend, likewise longitudinally, parallel to said side walls 7 and which likewise connect the top wall 5 to the base wall 6 and which form longitudinally extending chambers 10 which extend over the entire length of the basic body 4.

The basic body 4 is preferably formed from light metal, in particular from an aluminum alloy, and is produced expediently and cost-effectively in an extrusion process. The wall thicknesses of all the walls 5, 6, 7, 9 of the basic body are approximately equal, wherein to avoid stress peaks, transitions between a web 9 and the base wall 6 and the top wall 5 are of rounded design with a radius which is greater than or equal to the wall thickness of the web 9 or the wall thickness of the base wall 6 or top wall 5. It is of course also possible for the wall thickness of a web 9 to be smaller, strength permitting, than the wall thickness of the base wall 6, top wall 5 and side walls 7.

In each case one cap 11 can be placed onto the open ends of the basic body 4, which cap 11 can be sealingly connected to the basic body 4, preferably by means of a weld seam 12. Said caps 11 engage over the ends of all the chambers 10 and form a free space 10' which connects the chambers 10, such that the chambers 10 are connected to one another in the manner of a line with a relatively large cross section. The caps 11 are either deep-drawn, forged or else cast, preferably by means of a pressure-die-casting process.

To connect the caps 11 to the basic body 4, those edges 13, 14 which bear against one another undergo pre-treatment, with expedient variants being illustrated in FIG. 6 and FIG. 7. A rabbet 15 is thus formed into at least one of the edges 13, 14 so as to form an overlap. Friction stir welding has proven to be particularly expedient as a welding process for connecting the caps 11 to the basic body 4.

Mounting elements 16 which are provided on the caps 11 serve to secure the position of the inner tank 3 in the outer tank 1. One preferred variant is illustrated in FIG. 8. According to said variant, a mounting sleeve 18 is provided at an indentation 17 of the inner tank, which mounting sleeve 18 is preferably likewise formed from an aluminum alloy. A synthetic body 19, preferably formed as a fiber-composite tube with a metal coating, can be inserted into said mounting sleeve 18. Said synthetic body 19 projects into a mounting sleeve 21 which is likewise provided in a convexity 20 of the outer tank 1, which mounting sleeve 21 is preferably likewise formed from an aluminum alloy. The mounting sleeves 18, 21 are adhesively bonded to, welded to or integrally formed with the outer tank 1 and the inner tank 3. The synthetic body 19 may be adhesively bonded or screwed, for example by means of a sleeve nut, to the mounting sleeves 18, 21.

Furthermore, the position of the inner tank 3 in the outer tank 1 can be further secured by means of spacers 22 which are arranged on (or integrally formed with) the caps 11 and which bear against the outer tank 1. Extraction and filling lines 23 which are arranged on the outer side of the top wall 5 likewise contribute to stabilizing the position of the inner tank 3 in the outer tank 1.

Any tank fittings, such as sensors for pressure and/or temperature and/or filling level and the associated lines, and an extraction and filling line 23, are provided in the interior of one of the caps 11 or both caps 11, with any pipe stubs which lead outward being integrated into the caps 11.

The basic body 4, which can be subjected to high loading, in connection with the caps 11 which are formed as curved shells results in a pressure tank which can be subjected to equally high loading from all sides. The basic body 4 may be produced economically in a short production time, and it is merely necessary to cut said basic body 4 from the extruded profile in different lengths for different sizes of tanks.

The number of chambers 10 provided in the basic body 4 may of course be varied and is in any case dependent on the desired internal volume of the inner tank 3.

The production of the inner tank 3 may take place significantly faster, more reliably and more cheaply than for example the production of a barrel-shaped inner tank. Only two weld seams 12 are required, specifically the weld seams 12 which connect the caps 11 to the basic body 4.

FIG. 9 shows a further possible embodiment of an inner tank 24 according to the invention. As can be seen, webs 25 connect the base wall 26 to the top wall 27 of the basic body 28 and thus form, in the basic body, chambers for storing a gas and/or a liquid. The chambers 29 are arranged between the webs 25. As can be seen, the basic body 28 of FIG. 9 has substantially a planar base wall 26 and top wall 27.

As can be seen from FIGS. 9-11, the webs 25 each have cutouts 30 in the region of the base wall 26 and top wall 27. Said cutouts 30 are provided in the region of contact between the cap 31 and the basic body 28, in particular of contact between the cap 31 and the base wall 26 and top wall 27 of the basic body. If the cap 31 is welded to the basic body 28, it is thereby prevented that an excessive amount of welding heat is dissipated from the weld points 32 via the web 25 during the welding process. As can be seen from FIG. 11, the cap bears in an abutting fashion, in particular as a so-called butt seam. A butt seam of said type may be produced for example by means of friction stir welding. In this way, it is possible to ensure a uniform weld seam. As a result of the cutout 30, the chambers 29 of the basic body 28 can communicate with one another. In this way, it is for example possible for a, for example arched, cap 31 to be provided which closes off only a single chamber and which does not engage over a plurality of chambers 29. In this case, the cap 31 is fastened, in particular by means of welding and/or soldering, to the base wall 26 and top wall 27 and to the webs 25 which delimit the chamber 29 at both sides. According to another embodiment, it is however likewise possible to provide a cap which engages over a plurality of chambers and which sealingly closes off the basic body 28 for example at the base wall 26, the top wall 27 and the side walls of said basic body 28, and which thus delimits the inner tank 24 at the side.

A further possible embodiment according to FIGS. 12-14 differs from the already-discussed embodiments in that the base wall 33 and the top wall 34 each have a slight bulge, in particular a curvature which is at least partially convex as viewed from the outside. Here, during the course of FEA calculations and tests, it has been proven that a slight bulge firstly significantly improves the stability of the inner tank and secondly ensures efficient space utilization and a good insulation capability of the inner tank. Here, to define the bulge, proceeding from a planar reference plane 35 in each case in the region of the base wall 33 or top wall 34, the normal spacing D between the reference plane 35 and the inner contour of the base 33 or top wall 34 is measured centrally (center line M) between the webs 36 of the chamber 37.

In the present embodiment, the spacing D is approximately 8% of the width of the chamber B (measured in the region of the reference plane). The planar reference plane 35 is defined in each case as a planar connecting plane of the base-wall-side or top-wall-side straight ends of the webs 36 (without or before any rounding is provided at the transition to the base wall or top wall).

As can be seen from the figures, cutouts are also provided on the webs in this embodiment.

A further embodiment is illustrated in FIG. 15. Here, a flat cap 38 is provided which closes off the chambers 39 of the basic body 40. As can be seen from FIG. 15, cutouts 42 are likewise provided in the webs 41 in the region in which the webs 41 adjoin the base wall and top wall. If the cap 38 is fastened along the outer edge 43 to the basic body 40 by means of a weld seam or solder seam, a uniform weld seam or solder seam is thereby ensured. Furthermore, it is possible for an exchange of gas and/or liquid between the chambers 39 to take place via the recesses or cutouts 42 in the basic body 40 which is closed off by means of the cap 38. As can also be seen from FIG. 15, the cap 38 has elongate recesses 43. The dimensions of said elongate recesses correspond substantially to the dimensions of the longitudinal-side ends 44 of the webs 41. If the basic body 40 is closed off by means of the cap 38, the longitudinal-side ends 44 of the webs 41 project into the corresponding recesses 43. According to one preferred embodiment of the invention, the longitudinal-side ends 44 of the webs 41 extend here through the corresponding recesses 43 of the cap 38 and project out of the cap 38 at that side of the latter which faces away from the chambers 39. According to one particular embodiment, the longitudinal-side ends 44 of the webs 41 are fastened to the cap 38 in the region of the recesses 43, for example by means of a gas-tight welded or soldered connection. By means of said additional fastening, it is possible for the stability of the inner tank to be further improved, and to realize a particularly compact design of the inner tank.

Instead of a welded or soldered connection, it is also possible for an adhesively bonded connection to be used, assuming a correspondingly suitable process for this purpose.

The invention claimed is:

1. A fuel tank comprising an inner tank (3), of flat design, which is surrounded by an outer tank (1) and serves to hold a cryogenic liquid, the inner tank comprises:

(a) a longitudinally extending, single-piece basic body (4) having a top wall (5) and a base wall (6) which are connected by means of likewise longitudinally extending side walls (7), and having at least two longitudinally running, substantially straight webs (9) which connect the base wall (6) to the top wall (5) so as to form at least one longitudinally extending chamber (10) which is arranged between the webs and which extends over the entire length of the basic body (4) and in each case from the base wall (6) to the top wall (5), with the longitudinally extending chamber having a predetermined width between the webs, (b) at least two caps (11) which sealingly close off the two open ends of the basic body (4) in each case at the periphery, and (c) with at least one of the top wall and base wall having, in each case with respect to a planar reference top wall and reference base wall, a bulge with a spacing, measured centrally between the webs, in each case between the inner contour of the top wall and base wall and the planar reference top wall and reference base wall, of less than 30% of the width of the chamber, wherein the webs have a cutout (30) in the region of the fastening of the caps (31) to at least one of the base wall and top wall, and wherein the caps are fastened by means of an encircling weld seam, to the basic body, and the webs have the cutout (30) in each case in the region of the weld seam, between the caps and the basic body.

2. The fuel tank according to claim 1, wherein the caps (11) engage over the ends of the chambers (10) in each case.

3. The fuel tank according to claim 2, wherein at least one of the caps (11) forms a free space (10') which connects the chambers (19).

4. The fuel tank according to claim 3, wherein at least one of the caps (11) is of substantially flat design.

5. The fuel tank according to claim 1, wherein at least one of the caps (38) has a number of recesses (43) into which a free end (44), which is aligned in the longitudinal direction of the basic body, of at least one of the webs (41) projects.

6. The fuel tank according to claim 5, wherein the web is fastened by means of a weld seam to the cap (38) in the region of the recess (43) of the cap (38).

7. The fuel tank according to claim 1, wherein the basic body substantially has a profile, transversely with respect to the longitudinal extent, in the shape of a rectangle, with the longitudinal edges, which connect the side walls (7) to the base wall (6) and to the top wall (5) designed as rounded portions (8).

8. The fuel tank according to claim 1, wherein the basic body (4) is designed as a single-piece extruded profile.

9. The fuel tank according to claim 1, wherein the transitions between the web (9) and base wall (6) or top wall (5) are rounded with a radius which is greater than or equal to the wall thickness of the web (9), the wall thickness of the base wall (6), and the top wall (5).

10. The fuel tank according to claim 1, wherein the basic body (4) and the caps (11) are formed from an aluminum alloy.

* * * * *